United States Patent
Girard et al.

(10) Patent No.: US 12,521,702 B2
(45) Date of Patent: Jan. 13, 2026

(54) TRIMETALLIC CATALYST MADE FROM NICKEL, MOLYBDENUM AND TUNGSTEN AND USE THEREOF IN A HYDROTREATMENT AND/OR HYDROCRACKING PROCESS

(71) Applicant: IFP Energies Nouvelles, Rueil-Malmaison (FR)

(72) Inventors: Etienne Girard, Rueil-Malmaison (FR); Audrey Bonduelle, Rueil-Malmaison (FR)

(73) Assignee: IFP Energies Nouvelles, Rueil-Malmaison (FR)

( * ) Notice: Subject to any disclaimer, the term of this patent is extended or adjusted under 35 U.S.C. 154(b) by 339 days.

(21) Appl. No.: 18/013,309

(22) PCT Filed: Jun. 18, 2021

(86) PCT No.: PCT/EP2021/066614
§ 371 (c)(1),
(2) Date: Dec. 28, 2022

(87) PCT Pub. No.: WO2022/002641
PCT Pub. Date: Jan. 6, 2022

(65) Prior Publication Data
US 2023/0294081 A1    Sep. 21, 2023

(30) Foreign Application Priority Data

Jun. 29, 2020 (FR) ...................... 2006796

(51) Int. Cl.
*B01J 23/888* (2006.01)
*B01J 21/12* (2006.01)
*B01J 27/19* (2006.01)
*C10G 47/12* (2006.01)

(52) U.S. Cl.
CPC .......... *B01J 23/8885* (2013.01); *B01J 21/12* (2013.01); *B01J 27/19* (2013.01); *C10G 47/12* (2013.01)

(58) Field of Classification Search
CPC ........ B01J 21/12; B01J 23/8885; B01J 27/19; B01J 37/0203; B01J 37/20; C10G 45/08; C10G 45/50; C10G 47/12
See application file for complete search history.

(56) References Cited

U.S. PATENT DOCUMENTS

| | | | |
|---|---|---|---|
| 6,162,350 A | 12/2000 | Soled et al. | |
| 6,299,760 B1 | 10/2001 | Soled et al. | |
| 6,566,296 B2 | 5/2003 | Plantenga et al. | |
| 8,697,598 B2 | 4/2014 | Long et al. | |
| 2009/0139898 A1* | 6/2009 | Long ..................... | C10G 49/08 502/211 |
| 2017/0165644 A1 | 6/2017 | Miller et al. | |
| 2019/0126254 A1 | 5/2019 | Medellín Rivera et al. | |
| 2019/0233751 A1* | 8/2019 | Medoff ................... | C12P 7/10 |

FOREIGN PATENT DOCUMENTS

| | | |
|---|---|---|
| FR | 3083142 A1 | 1/2020 |
| WO | 2020002135 A1 | 1/2020 |

OTHER PUBLICATIONS

International Search report PCT/EP2021/066614 dated Sep. 22, 2021 (pp. 1-2).

* cited by examiner

*Primary Examiner* — Brian A Mccaig
(74) *Attorney, Agent, or Firm* — Millen, White, Zelano & Branigan, P.C; Brion P. Heaney

(57) ABSTRACT

A subject matter of the invention is a catalyst comprising a support and an active phase consisting of nickel, molybdenum and tungsten, and phosphorus, the nickel content, measured in the NiO form, is between 3% and 4% by weight; the molybdenum content, measured in the $MoO_3$ form, is between 2% and 4% by weight; the tungsten content, measured in the $WO_3$ form, is between 34% and 40% by weight; the phosphorus content, measured in the $P_2O_5$ form, is between 3% and 4% by weight, with respect to the total weight of the catalyst; the $WO_3/MoO_3$ molar ratio is between 5.3 and 12.4 mol/mol, the $NiO/(WO_3+MoO_3)$ molar ratio is between 0.20 and 0.33 mol/mol and the $P_2O_5/(WO_3+MoO_3)$ molar ratio is between 0.21 and 0.34 mol/mol. The invention also relates to its method of preparation and to its use in hydrotreating and/or hydrocracking.

20 Claims, No Drawings

TRIMETALLIC CATALYST MADE FROM NICKEL, MOLYBDENUM AND TUNGSTEN AND USE THEREOF IN A HYDROTREATMENT AND/OR HYDROCRACKING PROCESS

TECHNICAL FIELD

The invention relates to a trimetallic catalyst based on nickel, molybdenum and tungsten, to its method of preparation and to its use in the field of hydrotreating and/or hydrocracking.

Conventional hydrotreating catalysts generally comprise an oxide support and an active phase based on metals from groups VIb and VIII in their oxide forms and also on phosphorus. The preparation of these catalysts generally comprises a stage of impregnation of the metals and the phosphorus on the support, followed by drying and calcination making it possible to obtain the active phase in their oxide forms. Before their use in a hydrotreating and/or hydrocracking reaction, these catalysts are generally subjected to a sulfidation in order to form the active entity.

The addition of an organic compound to the hydrotreating catalysts in order to improve their activity has been recommended by a person skilled in the art, in particular for catalysts which have been prepared by impregnation followed by drying without subsequent calcination. These catalysts are often referred to as "additive-impregnated dried catalysts".

Usually, a catalyst for the hydrotreating of hydrocarbon cuts has the aim of removing the sulfur-based, nitrogen-based or aromatic compounds contained in them in order, for example, to make a petroleum product to the required specifications (sulfur content, aromatics content, and the like) for a given application (motor vehicle fuel, gasoline or gas oil, domestic fuel oil, jet fuel).

Due to the tightening of legislation with regard to the quality of the air in many countries, continuous efforts are being made to develop more effective catalysts and processes for the production of low sulfur fuels, in particular diesel. Although great progress has been made in the development of efficient catalysts for these processes, major challenges remain, for example their modest saturation activity for aromatic hydrocarbons. The improvement in the aromatic saturation activity of hydrotreating catalysts has become a research priority since recent environmental restrictions have established minimum values for the cetane number and lower limits for the polyaromatics contents in diesel cuts.

Trimetallic catalysts based on nickel, molybdenum and tungsten are known to increase not only hydrodesulfurization (HDS) and hydrodenitrogenation (HDN) but also the hydrogenation of aromatics (HDA).

For example, there are documents describing bulk NiMoW trimetallic catalysts, with a low binder content (U.S. Pat. Nos. 6,162,350, 6,299,760, WO00/41810, U.S. Pat. No. 6,566,296 or even US2017/0165644). These catalysts, also called "bulk" catalysts, do not comprise a support. Although these catalysts exhibit a high activity in hydrotreating, they exhibit the disadvantages of being very expensive (high content of metals) and non-regenerable.

The prior art also mentions supported NiMoW trimetallic catalysts, such as described, for example, by Solmanov et al. in the publication Russian Journal of Applied Chemistry, 2018, Vol. 91, No. 8, pp. 1363-1369.

The document US2019/126254 describes a supported NiMoWP catalyst containing between 15% and 25% by weight, expressed as oxides, of Mo and/or W, between 3% and 6% by weight, expressed as oxides, of Ni, between 0.1% and 1% by weight, expressed as oxides, of P, and between 0.1 mol % and 0.7 mol % of additive, with respect to the metals (VIb+VIII).

The document U.S. Pat. No. 8,697,598 discloses a supported NiMoW catalyst containing phosphorus and/or fluorine with a nickel content between 1% and 10% by weight (expressed as NiO), a total content of molybdenum and tungsten of between 10% and 50% by weight (expressed as oxides), fluorine and/or phosphorus, expressed as element, in a content between 0.2% and 14% by weight and a $WO_3/Mo_3$ molar ratio of between 2.6-30.

Whatever the catalyst chosen, the modifications induced do not always make it possible to increase the performance qualities of the catalyst sufficiently to meet the specifications concerning the sulfur, nitrogen and/or aromatics contents of fuels. Furthermore, it is often very complicated to deploy them industrially since the methods are complex to implement.

Consequently, it emerges as essential, for catalyst manufacturers, to find novel hydrotreating and/or hydrocracking catalysts having improved performance qualities.

SUMMARY

The invention relates to a catalyst comprising a support based on alumina or silica or silica-alumina, an active phase consisting of nickel, molybdenum and tungsten, and phosphorus, characterized in that:

the content of nickel, measured in the NiO form, is between 3% and 4% by weight, with respect to the total weight of the catalyst, the content of molybdenum, measured in the $MoO_3$ form, is between 2% and 4% by weight, with respect to the total weight of the catalyst, the content of tungsten, measured in the $WO_3$ form, is between 34% and 40% by weight, with respect to the total weight of the catalyst, the content of phosphorus, measured in the $P_2O_5$ form, is between 3% and 4% by weight, with respect to the total weight of the catalyst, the $WO_3/MoO_3$ molar ratio is between 5.3 and 12.4 mol/mol, the $NiO/(WO_3+MoO_3)$ molar ratio is between 0.20 and 0.33 mol/mol, the $P_2O_5/(WO_3+MoO_3)$ molar ratio is between 0.105 and 0.170 mol/mol.

The applicant company has discovered, surprisingly, that a catalyst based on an active phase consisting of nickel, molybdenum and tungsten in the presence of phosphorus, which are deposited on a support, and exhibiting specific ratios between these different metals and/or phosphorus, exhibits, by a synergistic effect, a better hydrotreating activity, in particular in the hydrogenation of aromatics (HDA) but also in hydrodesulfurization (HDS) and/or in hydrodenitrogenation (HDN), in comparison with the catalysts disclosed in the prior art. Typically, by virtue of the increase in the activity, the temperature required to achieve a desired sulfur, nitrogen or aromatics content (for example a maximum of 10 ppm of sulfur in the case of a gas oil feedstock, in ULSD or Ultra Low Sulfur Diesel mode, or also a content <8% by weight of polyaromatics and a cetane number >46 (summer) and 43-46 (winter)) may be lowered. Similarly, the stability is increased, since the cycle time is prolonged by virtue of the necessary temperature reduction.

Without wishing to be committed to any one theory, an optimization of the content of each metal and of phosphorus using specific ratios would make it possible to obtain an active phase bringing about an improvement in the catalytic performance qualities. This is because tungsten is known to be more active in the hydrogenation of aromatics than molybdenum; however, its sulfidation is more difficult. The proximity of molybdenum in the active phase containing tungsten and the increase in the $WO_3/MoO_3$ ratio make it possible to improve the sulfidability of the tungsten and the catalytic performance qualities observed, up to a certain $WO_3/MoO_3$ ratio where the molybdenum content is too low to influence the sulfidability of the tungsten. Thus, the optimization of the $WO_3/MoO_3$ ratio, in combination with the optimized $NiO/(WO_3+MoO_3)$ and $P_2O_5/(WO_3+MoO_3)$ ratios, makes it possible to obtain a catalyst which is very active in hydrotreating, in particular in the hydrogenation of aromatics (HDA).

According to an alternative form, the catalyst is characterized in that:
- the content of nickel, measured in the NiO form, is between 3.1% and 3.9% by weight, with respect to the total weight of the catalyst,
- the content of molybdenum, measured in the $MoO_3$ form, is between 2.2% and 3.8% by weight, with respect to the total weight of the catalyst,
- the content of tungsten, measured in the $WO_3$ form, is between 35% and 39.9% by weight, with respect to the total weight of the catalyst,
- the content of phosphorus, measured in the $P_2O_5$ form, is between 3.1% and 3.9% by weight, with respect to the total weight of the catalyst,
- the $WO_3/MoO_3$ molar ratio is between 5.7 and 11.1 mol/mol,
- the $NiO/(WO_3+MoO_3)$ molar ratio is between 0.21 and 0.31 mol/mol,
- the $P_2O_5/(WO_3+MoO_3)$ molar ratio is between 0.110 and 0.165 mol/mol.

According to an alternative form, the catalyst is characterized in that:
- the content of nickel, measured in the NiO form, is between 3.2% and 3.8% by weight, with respect to the total weight of the catalyst,
- the content of molybdenum, measured in the $MoO_3$ form, is between 2.5% and 3.5% by weight, with respect to the total weight of the catalyst,
- the content of tungsten, measured in the $WO_3$ form, is between 36% and 39% by weight, with respect to the total weight of the catalyst,
- the content of phosphorus, measured in the $P_2O_5$ form, is between 3.2% and 3.8% by weight, with respect to the total weight of the catalyst,
- the $WO_3/MoO_3$ molar ratio is between 6.4 and 9.7 mol/mol,
- the $NiO/(WO_3+MoO_3)$ molar ratio is between 0.22 and 0.30 mol/mol,
- the $P_2O/(WO_3+MoO_3)$ molar ratio is between 0.115 and 0.160 mol/mol.

According to an alternative form, the catalyst exhibits a density of metals from group VIb, expressed as number of atoms of said metals per unit area of the catalyst, of between 5 and 12 atoms of the metals from group VIb per $nm^2$ of catalyst.

According to an alternative form, the catalyst additionally contains an organic compound containing oxygen and/or nitrogen and/or sulfur.

According to this alternative form, the organic compound is chosen from a compound comprising one or more chemical functional groups chosen from a carboxyl, alcohol, thiol, thioether, sulfone, sulfoxide, ether, aldehyde, ketone, ester, carbonate, amine, nitrile, imide, oxime, urea or amide functional group or also compounds including a furan ring or also sugars.

According to an alternative form, the organic compound is chosen from γ-valerolactone, 2-acetylbutyrolactone, triethylene glycol, diethylene glycol, ethylene glycol, ethylenediaminetetraacetic acid (EDTA), maleic acid, malonic acid, citric acid, acetic acid, gluconic acid, glucose, fructose, sucrose, sorbitol, xylitol, γ-ketovaleric acid, a di($C_1$-$C_4$ alkyl) succinate and more particularly dimethyl succinate, dimethylformamide, 1-methyl-2-pyrrolidinone, propylene carbonate, 2-methoxyethyl 3-oxobutanoate, bicine, tricine, 2-furaldehyde (also known under the name furfural), 5-hydroxymethylfurfural (also known under the name 5-(hydroxymethyl)-2-furaldehyde or 5-HMF), 2-acetylfuran, 5-methyl-2-furaldehyde, ascorbic acid, butyl lactate, ethyl lactate, butyl butyryllactate, ethyl 3-hydroxybutanoate, ethyl 3-ethoxypropanoate, 2-ethoxyethyl acetate, 2-butoxyethyl acetate, 2-hydroxyethyl acrylate, 1-vinyl-2-pyrrolidinone, 1,3-dimethyl-2-imidazolidinone, 1,5-pentanediol, 1-(2-hydroxyethyl)-2-pyrrolidinone, 1-(2-hydroxyethyl)-2,5-pyrrolidinedione, 5-methyl-2(3H)-furanone, 1-methyl-2-piperidinone, 4-aminobutanoic acid, butyl glycolate, ethyl 2-mercaptopropanoate, ethyl 4-oxopentanoate, diethyl maleate, dimethyl maleate, dimethyl fumarate, diethyl fumarate, dimethyl adipate and dimethyl 3-oxoglutarate.

According to an alternative form, the content of organic compound is between 1% and 30% by weight, with respect to the total weight of the catalyst.

According to one alternative form, the catalyst is at least partially sulfided.

The invention also relates to a process for the preparation of the catalyst according to the invention comprising the following stages:
a) at least one nickel precursor, one molybdenum precursor and one tungsten precursor and phosphorus are brought into contact with a support based on alumina or silica or silica-alumina, so as to obtain a catalyst precursor;
b) said catalyst precursor resulting from stage a) is dried at a temperature of less than 200° C.

According to an alternative form, the preparation process additionally comprises a stage c) in which the catalyst obtained in stage b) is calcined at a temperature of between 200° C. and 550° C.

According to an alternative form, the preparation process additionally comprises a stage d) in which the catalyst obtained in stage b) or in stage c) is sulfided.

The invention also relates to the use of the catalyst according to the invention in a process for the hydrotreating and/or hydrocracking of hydrocarbon cuts.

DETAILED DESCRIPTION OF THE INVENTION

Definitions

In what follows, the groups of chemical elements are given according to the CAS classification (CRC Handbook of Chemistry and Physics, published by CRC Press, editor-in-chief D. R. Lide, 81st edition, 2000-2001). For example, group VIII according to the CAS classification corresponds to the metals of columns 8, 9 and 10 according to the new IUPAC classification.

The term "specific surface" is understood to mean the BET specific surface ($S_{BET}$ in m²/g) determined by nitrogen adsorption in accordance with the standard ASTM D 3663-78 established from the Brunauer-Emmett-Teller method described in the journal "*The Journal of the American Chemica/Society*", 1938, 60, 309.

Total pore volume of the catalyst or of the support used for the preparation of the catalyst is understood to mean the volume measured by mercury intrusion porosimetry according to the standard ASTM D4284-83 at a maximum pressure of 4000 bar (400 MPa), using a surface tension of 484 dynes/cm and a contact angle of 140°. The wetting angle was taken equal to 140° following the recommendations of the publication "Techniques de l'ingénieur, traité analyse et caractérisation" [Techniques of the Engineer, Analysis and Characterization Treatise], pages 1050-1055, written by Jean Charpin and Bernard Rasneur. In order to obtain better accuracy, the value of the total pore volume corresponds to the value of the total pore volume measured by mercury intrusion porosimetry measured on the sample minus the value of the total pore volume measured by mercury intrusion porosimetry measured on the same sample for a pressure corresponding to 30 psi (approximately 0.2 MPa).

The contents of metals from group VIII and of phosphorus are measured by X-ray fluorescence.

The contents of metal from group VIb, of metal from group VIII and of phosphorus in the catalyst are expressed as oxides after correction for the loss on ignition of the catalyst sample at 550° C. in a muffle furnace for two hours. The loss on ignition is due to the loss of moisture. It is determined according to ASTM D7348.

Hydrotreating is understood to mean reactions encompassing in particular hydrodesulfurization (HDS), hydrodenitrogenation (HDN) and hydrogenation of aromatics (HDA).

Catalyst

The invention relates to a catalyst comprising a support based on alumina or silica or silica-alumina, an active phase consisting of nickel, molybdenum and tungsten, and phosphorus, characterized in that:
the content of nickel, measured in the NiO form, is between 3% and 4% by weight, with respect to the total weight of the catalyst,
the content of molybdenum, measured in the $MoO_3$ form, is between 2% and 4% by weight, with respect to the total weight of the catalyst,
the content of tungsten, measured in the $WO_3$ form, is between 34% and 40% by weight, with respect to the total weight of the catalyst,
the content of phosphorus, measured in the $P_2O_5$ form, is between 3% and 4% by weight, with respect to the total weight of the catalyst,
the $WO_3/MoO_3$ molar ratio is between 5.3 and 12.4 mol/mol,
the $NiO/(WO_3+MoO_3)$ molar ratio is between 0.20 and 0.33 mol/mol,
the $P_2O_5/(WO_3+MoO_3)$ molar ratio is between 0.105 and 0.170 mol/mol.

The hydrogenating function of said catalyst, also known as active phase, is constituted of nickel, molybdenum and tungsten.

The content of nickel, measured in the NiO form, is between 3% and 4% by weight, with respect to the total weight of the catalyst, preferably between 3.1% and 3.9% by weight and more preferably between 3.2% and 3.8% by weight.

The content of molybdenum, measured in the $MoO_3$ form, is between 2% and 4% by weight, with respect to the total weight of the catalyst, preferably between 2.2% and 3.8% by weight and more preferably between 2.5% and 3.5% by weight.

The content of tungsten, measured in the $WO_3$ form, is between 34% and 40% by weight, with respect to the total weight of the catalyst, preferably between 35% and 39.9% by weight and more preferably between 36% and 39% by weight.

The $P_2O_5/(WO_3+MoO_3)$ molar ratio is between 0.105 and 0.170 mol/mol, preferably between 0.110 and 0.165 mol/mol and more preferably still between 0.115 and 0.160 mol/mol.

The $NiO/(WO_3+MoO_3)$ molar ratio is between 0.20 and 0.33 mol/mol, preferably between 0.21 and 0.31 mol/mol and more preferably still between 0.22 and 0.30 mol/mol.

The catalyst according to the invention also comprises phosphorus as dopant. The dopant is an added element which in itself does not exhibit any catalytic nature but which increases the catalytic activity of the active phase.

The content of phosphorus in said catalyst, measured in the $P_2O_5$ form, is preferably between 3% and 4% by weight, with respect to the total weight of the catalyst, preferably between 3.1% and 3.9% by weight and very preferably between 3.2% and 3.8% by weight.

The $P_2O_5/(WO_3+MoO_3)$ molar ratio is between 0.21 and 0.34 mol/mol, preferably between 0.22 and 0.33 mol/mol and more preferably still between 0.23 and 0.32 mol/mol.

In addition, the catalyst exhibits a density of metals from group VIb (Mo+W), expressed as number of atoms of said metals per unit area of the catalyst, which is between 5 and 12 atoms of metals from group VIb per nm² of catalyst, preferably between 6 and 11, more preferably still between 7 and 10. The density of metals from group VIb, expressed as number of atoms of metals from group VIb per unit area of the catalyst (number of atoms of metals from group VIb per nm² of catalyst), is calculated, for example, from the following relationship:

$$d(\text{metal from group } VIb) = \frac{\left(\frac{X_{Mo}}{M_{Mo}} + \frac{X_W}{M_W}\right) \times N_A}{100 \times 10^{18} \times S}$$

with:
$X_{Mo}$=% by weight of molybdenum;
$X_W$=% by weight of tungsten;
$N_A$=Avogadro's number, equal to 6.022×10²³;
S=Specific surface of the catalyst (m²/g), measured according to the standard ASTM D3663;
$M_{Mo}$=molar mass of molybdenum;
$M_W$=molar mass of tungsten.

By way of example, if the catalyst contains 3% by weight of molybdenum oxide $MoO_3$ (i.e. 2.0% by weight of Mo) and 29.3% by weight of tungsten oxide and has a specific surface of 122 m²/g, the density d(Mo+W) is equal to:

$$d(Mo + W) = \frac{\left(\frac{2.0}{95.94} + \frac{29.3}{183.84}\right) \times N_A}{100 \times 10^{18} \times 122}$$

= 8.9 atoms of metals from group $VIb$/nm2 of catalyst

The catalyst according to the invention can advantageously also contain at least one dopant chosen from boron, fluorine and a mixture of boron and fluorine.

When the catalyst contains boron or fluorine or a mixture of boron and fluorine, the content of boron or of fluorine or of a mixture of the two is preferably between 0.1% and 10% by weight, expressed as boron oxide and/or as fluorine, with respect to the total weight of the catalyst, preferably between 0.2% and 7% by weight and very preferably between 0.2% and 5% by weight.

The pore volume of the catalyst is generally between 0.1 cm$^3$/g and 1.5 cm$^3$/g, preferably between 0.15 cm$^3$/g and 1.1 cm$^3$/g. The total pore volume is measured by mercury porosimetry according to the standard ASTM D4284 with a wetting angle of 140°, as described in the work by Rouquerol F., Rouquerol J. and Singh K., "Adsorption by Powders & Porous Solids: Principle, Methodology and Applications", Academic Press, 1999, for example by means of an Autopore III™ model machine of the Micromeritics™ brand.

The catalyst is characterized by a specific surface of between 5 and 350 m$^2$/g, preferably of between 10 and 330 m$^2$/g, preferably of between 40 and 320 m$^2$/g, very preferably of between 50 and 300 m$^2$/g. The specific surface is determined in the present invention by the BET method according to the standard ASTM D3663, which method is described in the same work mentioned above.

The support of the catalyst comprises, and preferably consists of, an alumina or a silica or a silica-alumina.

When the support of said catalyst is based on alumina, it contains more than 50% by weight of alumina, with respect to the total weight of the support, and in general it contains only alumina or silica-alumina as defined below.

Preferably, the support comprises alumina and preferably extruded alumina. Preferably, the alumina is γ-alumina.

The alumina support advantageously exhibits a total pore volume of between 0.1 and 1.5 cm$^3$·g$^{-1}$, preferably between 0.4 and 1.1 cm$^3$·g$^{-1}$. The total pore volume is measured by mercury porosimetry according to the standard ASTM D4284 with a wetting angle of 140°, as described in the work by Rouquerol F., Rouquerol J. and Singh K., "*Adsorption by Powders & Porous Solids: Principle, Methodology and Applications*", Academic Press, 1999, for example by means of an Autopore III™ model machine of the Micromeritics™ brand.

The specific surface of the alumina support is advantageously between 5 and 400 m$^2$·g$^{-1}$, preferably between 10 and 350 m$^2$·g$^{-1}$, more preferably between 40 and 350 m$^2$·g$^{-1}$. The specific surface is determined in the present invention by the BET method according to the standard ASTM D3663, which method is described in the same work mentioned above.

In another preferred case, the support of said catalyst is a silica-alumina containing at least 50% by weight of alumina, with respect to the total weight of the support. The silica content in the support is at most 50% by weight, with respect to the total weight of the support, generally less than or equal to 45% by weight, preferably less than or equal to 40%.

Sources of silicon are well known to a person skilled in the art. Mention may be made, by way of example, of silicic acid, silica in the powder form or in the colloidal form (silica sol), or tetraethyl orthosilicate Si(OEt)$_4$.

When the support for said catalyst is based on silica, it contains more than 50% by weight of silica, with respect to the total weight of the support, and, generally, it contains only silica.

According to a particularly preferred alternative form, the support consists of alumina, silica or silica-alumina.

In addition, the support can also advantageously contain a zeolite. In this case, any source of zeolite and any associated preparation method known to a person skilled in the art can be incorporated. Preferably, the zeolite is chosen from the group FAU, BEA, ISV, IWR, IWW, MEI, UWY and preferably the zeolite is chosen from the group FAU and BEA, such as zeolite Y and/or beta zeolite, and particularly preferably such as USY and/or beta zeolite. When the zeolite is present, its content is from 0.1% to 50% by weight, with respect to the total weight of the support.

The support is advantageously provided in the form of beads, extrudates, pellets or irregular and nonspherical agglomerates, the specific shape of which can result from a crushing stage.

The catalyst according to the invention can additionally comprise an organic compound or a group of organic compounds known for their role as additives. The function of the additives is to increase the catalytic activity in comparison with non-additive-impregnated catalysts. More particularly, the catalyst according to the invention can additionally comprise one or more oxygen-containing organic compounds and/or one or more nitrogen-containing organic compounds and/or one or more sulfur-containing organic compounds. Preferably, the catalyst according to the invention can additionally comprise one or more oxygen-containing organic compounds and/or one or more nitrogen-containing organic compounds. Preferably, the organic compound contains at least two carbon atoms and at least one oxygen and/or nitrogen atom, without containing other heteroatoms.

Generally, the organic compound is chosen from a compound comprising one or more chemical functional groups chosen from a carboxyl, alcohol, thiol, thioether, sulfone, sulfoxide, ether, aldehyde, ketone, ester, carbonate, amine, nitrile, imide, oxime, urea and amide functional group or also compounds including a furan ring or also sugars.

The oxygen-containing organic compound can be one or more chosen from compounds comprising one or more chemical functional groups chosen from a carboxyl, alcohol, ether, aldehyde, ketone, ester or carbonate functional group or also compounds including a furan ring or also sugars. An oxygen-containing organic compound is understood here to mean a compound not comprising another heteroatom. By way of example, the oxygen-containing organic compound can be one or more chosen from the group consisting of ethylene glycol, diethylene glycol, triethylene glycol, a polyethylene glycol (with a molecular weight of between 200 and 1500 g/mol), propylene glycol, 2-butoxyethanol, 2-(2-butoxyethoxy)ethanol, 2-(2-methoxyethoxy)ethanol, triethylene glycol dimethyl ether, glycerol, acetophenone, 2,4-pentanedione, pentanone, acetic acid, oxalic acid, maleic acid, malic acid, malonic acid, oxalic acid, gluconic acid, tartaric acid, citric acid, γ-ketovaleric acid, a di($C_1$-$C_4$ alkyl) succinate and more particularly dimethyl succinate, methyl acetoacetate, ethyl acetoacetate, 2-methoxyethyl 3-oxobutanoate, 2-methacryloyloxyethyl 3-oxobutanoate, dibenzofuran, a crown ether, orthophthalic acid, glucose, fructose, sucrose, sorbitol, xylitol, γ-valerolactone, 2-acetylbutyrolactone, propylene carbonate, 2-furaldehyde (also known under the name furfural), 5-hydroxymethylfurfural (also known under the name 5-(hydroxymethyl)-2-furaldehyde or 5-HMF), 2-acetylfuran, 5-methyl-2-furaldehyde, methyl 2-furoate, furfuryl alcohol (also known under the name furfuranol), furfuryl acetate, ascorbic acid, butyl lactate, ethyl lactate, butyl butyryllactate, ethyl 3-hydroxybutanoate, ethyl 3-ethoxypropanoate, methyl 3-methoxypropanoate, 2-ethoxyethyl acetate, 2-butoxyethyl acetate, 2-hydroxyethyl acrylate, 2-hydroxyethyl methacrylate, 1,5-pentanediol, 3-methyl-1,5-pentanediol, 1,5-hexanediol, 3-ethyl- 1,5-pentanediol, 2,4-diethyl-1,5-pentanediol, 5-methyl-2 (3H)-furanone, butyl glycolate, ethyl 4-oxopentanoate, diethyl maleate, dimethyl maleate, dimethyl fumarate, diethyl fumarate, dimethyl adipate, dimethyl 3-oxoglutarate, dimethyl tartrate, diethyl tartrate, diisopropyl tartrate, di(tert-butyl) tartrate, dimethyl malate, diethyl malate, diisopropyl malate and dibutyl malate.

The nitrogen-containing organic compound can be one or more chosen from compounds comprising one or more chemical functional groups chosen from an amine or nitrile functional group. A nitrogen-containing organic compound is understood here to mean a compound not comprising another heteroatom. By way of example, the nitrogen-containing organic compound can be one or more chosen from the group consisting of ethylenediamine, diethylenetriamine, hexamethylenediamine, triethylenetetramine, tetraethylenepentamine, pentaethylenehexamine, acetonitrile, octylamine, guanidine and a carbazole.

The oxygen- and nitrogen-containing organic compound can be one or more chosen from compounds comprising one or more chemical functional groups chosen from a carboxylic acid, alcohol, ether, aldehyde, ketone, ester, carbonate, amine, nitrile, imide, amide, urea or oxime functional group. An oxygen- and nitrogen-containing organic compound is understood here to mean a compound not comprising another heteroatom. By way of example, the oxygen- and nitrogen-containing organic compound can be one or more chosen from the group consisting of 1,2-cyclohexanediaminetetraacetic acid, monoethanolamine (MEA), 1-methyl-2-pyrrolidinone, dimethylformamide, ethylenediaminetetraacetic acid (EDTA), alanine, glycine, nitrilotriacetic acid (NTA), N-(2-hydroxyethyl)ethylenediamine-N,N',N'-triacetic acid (HEDTA), diethylenetriaminepentaacetic acid (DTPA), tetramethylurea, glutamic acid, dimethylglyoxime, bicine, tricine, 2-methoxyethyl cyanoacetate, 1-ethyl-2-pyrrolidinone, 1-vinyl-2-pyrrolidinone, 1,3-dimethyl-2-imidazolidinone, 1-(2-hydroxyethyl)-2-pyrrolidinone, 1-(2-hydroxyethyl)-2,5-pyrrolidinedione, 1-methyl-2-piperidinone, 1-acetyl-2-azepanone, 1-vinyl-2-azepanone and 4-aminobutanoic acid.

The sulfur-containing organic compound can be one or more chosen from compounds comprising one or more chemical functional groups chosen from a thiol, thioether, sulfone or sulfoxide functional group. By way of example, the sulfur-containing organic compound can be one or more chosen from the group consisting of thioglycolic acid, 2,2'-thiodiethanol, 2-hydroxy-4-methylthiobutanoic acid, a sulfone derivative of a benzothiophene or a sulfoxide derivative of a benzothiophene, ethyl 2-mercaptopropanoate, methyl 3-(methylthio)propanoate and ethyl 3-(methylthio) propanoate.

Preferably, the organic compound contains oxygen; preferably, it is chosen from γ-valerolactone, 2-acetylbutyrolactone, triethylene glycol, diethylene glycol, ethylene glycol, ethylenediaminetetraacetic acid (EDTA), maleic acid, malonic acid, citric acid, acetic acid, oxalic acid, gluconic acid, glucose, fructose, sucrose, sorbitol, xylitol, γ-ketovaleric acid, a di($C_1$-$C_4$ alkyl) succinate and more particularly dimethyl succinate, dimethylformamide, 1-methyl-2-pyrrolidinone, propylene carbonate, 2-methoxyethyl 3-oxobutanoate, bicine, tricine, 2-furaldehyde (also known under the name furfural), 5-hydroxymethylfurfural (also known under the name 5-(hydroxymethyl)-2-furaldehyde or 5-HMF), 2-acetylfuran, 5-methyl-2-furaldehyde, ascorbic acid, butyl lactate, ethyl lactate, butyl butyryllactate, ethyl 3-hydroxybutanoate, ethyl 3-ethoxypropanoate, 2-ethoxyethyl acetate, 2-butoxyethyl acetate, 2-hydroxyethyl acrylate, 1-vinyl-2-pyrrolidinone, 1,3-dimethyl-2-imidazolidinone, 1,5-pentanediol, 1-(2-hydroxyethyl)-2-pyrrolidinone, 1-(2-hydroxyethyl)-2,5-pyrrolidinedione, 5-methyl-2(3H)-furanone, 1-methyl-2-piperidinone, 4-aminobutanoic acid, butyl glycolate, ethyl 2-mercaptopropanoate, ethyl 4-oxopentanoate, diethyl maleate, dimethyl maleate, dimethyl fumarate, diethyl fumarate, dimethyl adipate and dimethyl 3-oxoglutarate.

When it/they is/are present, the total content of oxygen- and/or nitrogen- and/or sulfur-containing organic compound(s) present in the catalyst is generally between 1% and 30% by weight, preferably between 1.5% and 25% by weight and more preferably between 2% and 20% by weight, with respect to the total weight of the catalyst.

During the preparation of the catalyst requiring a drying stage, the drying stage(s) consecutive to the introduction of the organic compound is (are) carried out at a temperature of less than 200° C., so as to retain preferably at least 30%, preferably at least 50% and very preferably at least 70% of the amount of the organic compound introduced, calculated on the basis of the carbon remaining on the catalyst. The remaining carbon is measured by elemental analysis according to ASTM D5373.

According to one embodiment, the catalyst according to the invention comprises, and is preferably constituted of, a support based on alumina or silica or silica-alumina, an active phase consisting of nickel, molybdenum and tungsten, and phosphorus, characterized in that:
  the content of nickel, measured in the NiO form, is between 3% and 4% by weight, with respect to the total weight of the catalyst, preferably between 3.1% and 3.9% by weight and more preferably between 3.2% and 3.8% by weight,
  the content of molybdenum, measured in the $MoO_3$ form, is between 2% and 4% by weight, with respect to the total weight of the catalyst, preferably between 2.2% and 3.8% by weight and more preferably between 2.5% and 3.5% by weight,
  the content of tungsten, measured in the $WO_3$ form, is between 34% and 40% by weight, with respect to the total weight of the catalyst, preferably between 35% and 39.9% by weight and more preferably between 36% and 39% by weight,
  the content of phosphorus, measured in the $P_2O_5$ form, is between 3% and 4% by weight, with respect to the total weight of the catalyst, preferably between 3.1% and 3.9% by weight and more preferably between 3.2% and 3.8% by weight,
  the $WO_3/MoO_3$ molar ratio is between 5.3 and 12.4 mol/mol, preferably between 5.7 and 11.1 mol/mol and more preferably between 6.4 and 9.7 mol/mol,
  the $NiO/(WO_3+MoO_3)$ molar ratio is between 0.20 and 0.33 mol/mol, preferably between 0.21 and 0.31 mol/mol and more preferably between 0.22 and 0.30 mol/mol,
  the $P_2O_5/(WO_3+MoO_3)$ molar ratio is between 0.105 and 0.170 mol/mol, preferably between 0.110 and 0.165 mol/mol and more preferably between 0.115 and 0.160 mol/mol.

According to another embodiment, the catalyst according to the invention comprises, and is preferably constituted of, a support based on alumina or silica or silica-alumina, an active phase consisting of nickel, molybdenum and tungsten, and phosphorus, and an oxygen- and/or nitrogen- and/or sulfur-containing organic compound, characterized in that:
  the content of nickel, measured in the NiO form, is between 3% and 4% by weight, with respect to the total weight of the catalyst, preferably between 3.1% and 3.9% by weight and more preferably between 3.2% and 3.8% by weight, the content of molybdenum, measured in the $MoO_3$ form, is between 2% and 4% by weight, with respect to the total weight of the catalyst, preferably between 2.2% and 3.8% by weight and more preferably between 2.5% and 3.5% by weight, the content of tungsten, measured in the $WO_3$ form, is between 34% and 40% by weight, with respect to the total weight of the catalyst, preferably between 35% and 39.9% by weight and more preferably between 36% and 39% by weight, the content of phosphorus, measured in the $P_2O_5$ form, is between 3% and 4% by weight, with respect to the total weight of the catalyst, preferably between 3.1% and 3.9% by weight and more preferably between 3.2% and 3.8% by weight, the $WO_3/MoO_3$ molar ratio is between 5.3 and 12.4 mol/mol, preferably between 5.7 and 11.1 mol/mol and more preferably between 6.4 and 9.7 mol/mol, the $NiO/(WO_3+MoO_3)$ molar ratio is between 0.20 and 0.33 mol/mol, preferably between 0.21 and 0.31 mol/mol and more preferably between 0.22 and 0.30 mol/mol, the $P_2O_5/(WO_3+MoO_3)$ molar ratio is between 0.105 and 0.170 mol/mol, preferably between 0.110 and 0.165 mol/mol and more preferably between 0.115 and 0.160 mol/mol.

According to this embodiment, the organic compound is preferably chosen from γ-valerolactone, 2-acetylbutyrolactone, triethylene glycol, diethylene glycol, ethylene glycol, ethylenediaminetetraacetic acid (EDTA), maleic acid, malonic acid, citric acid, acetic acid, gluconic acid, glucose, fructose, sucrose, sorbitol, xylitol, γ-ketovaleric acid, a di($C_1$-$C_4$ alkyl) succinate and more particularly dimethyl succinate, dimethylformamide, 1-methyl-2-pyrrolidinone, propylene carbonate, 2-methoxyethyl 3-oxobutanoate, bicine, tricine, 2-furaldehyde (also known under the name furfural), 5-hydroxymethylfurfural (also known under the name 5-(hydroxymethyl)-2-furaldehyde or 5-HMF), 2-acetylfuran, 5-methyl-2-furaldehyde, ascorbic acid, butyl lactate, ethyl lactate, butyl butyryllactate, ethyl 3-hydroxybutanoate, ethyl 3-ethoxypropanoate, 2-ethoxyethyl acetate, 2-butoxyethyl acetate, 2-hydroxyethyl acrylate, 1-vinyl-2-pyrrolidinone, 1,3-dimethyl-2-imidazolidinone, 1,5-pentanediol, 1-(2-hydroxyethyl)-2-pyrrolidinone, 1-(2-hydroxyethyl)-2,5-pyrrolidinedione, 5-methyl-2(3H)-furanone, 1-methyl-2-piperidinone, 4-aminobutanoic acid, butyl glycolate, ethyl 2-mercaptopropanoate, ethyl 4-oxopentanoate, diethyl maleate, dimethyl maleate, dimethyl fumarate, diethyl fumarate, dimethyl adipate and dimethyl 3-oxoglutarate.

Preparation Process

The catalyst according to the invention can be prepared according to any method for the preparation of a supported catalyst known to a person skilled in the art.

The catalyst according to the invention can be prepared according to a preparation process comprising the following stages:

a) at least one nickel precursor, one molybdenum precursor and one tungsten precursor and phosphorus are brought into contact with a support based on alumina or silica or silica-alumina, so as to obtain a catalyst precursor, b) said catalyst precursor resulting from stage a) is dried at a temperature of less than 200° C., c) optionally, the catalyst precursor obtained in stage b) is calcined at a temperature of between 200° C. and 550° C., d) optionally, the catalyst obtained in stage b) or in stage c) is sulfided.

During the contacting operation of stage a), the catalyst according to the invention can be prepared by impregnation of the metals nickel, molybdenum and tungsten and of phosphorus onto the support selected. The impregnation can, for example, be carried out according to the method known to a person skilled in the art under the terminology of dry impregnation, in which just the amount of desired elements in the form of soluble salts is introduced into the chosen solvent, for example demineralized water, so as to fill as exactly as possible the porosity of the support.

The precursors of the active phase based on nickel, molybdenum and tungsten and the phosphorus can be introduced simultaneously or successively. The impregnation of each precursor can advantageously be carried out at least twice. The different precursors can thus advantageously be impregnated successively with a different impregnation and maturation time. One of the precursors can also be impregnated several times.

Preferably, the precursors of the active phase based on nickel, molybdenum and tungsten and the phosphorus are introduced simultaneously.

The nickel precursors which can be used are advantageously chosen from nickel oxides, hydroxides, hydroxycarbonates, carbonates and nitrates; for example, nickel hydroxycarbonate, nickel carbonate or nickel hydroxide are preferably used.

The molybdenum precursors which can be used are well known to a person skilled in the art. Use may be made, for example, among the sources of molybdenum, of the oxides and hydroxides, molybdic acids and their salts, in particular the ammonium salts, such as ammonium molybdate and ammonium heptamolybdate, phosphomolybdic acid ($H_3PMo_{12}O_{40}$) and their salts, and optionally silicomolybdic acid ($H_4SiMo_{12}O_{40}$) and its salts. The sources of molybdenum can also be heteropoly compounds of Keggin, lacunary Keggin, substituted Keggin, Dawson, Anderson or Strandberg type, for example. Use is preferably made of molybdenum trioxide and the heteropoly anions of Strandberg, Keggin, lacunary Keggin or substituted Keggin type.

The tungsten precursors which can be used are also well known to a person skilled in the art. For example, use may be made, among the sources of tungsten, of the oxides and hydroxides, tungstic acids and their salts, in particular the ammonium salts, such as ammonium tungstate and ammonium metatungstate, phosphotungstic acid and their salts, and optionally silicotungstic acid ($H_4SiW_{12}O_{40}$) and its salts. The sources of tungsten can also be heteropoly compounds of Keggin, lacunary Keggin, substituted Keggin or Dawson type, for example. Use is preferably made of the oxides and the ammonium salts, such as ammonium metatungstate, or the heteropoly anions of Keggin, lacunary Keggin or substituted Keggin type.

The phosphorus can be introduced completely or partially by impregnation. Preferably, it is introduced by an impregnation, preferably a dry impregnation, using a solution containing the nickel, molybdenum and tungsten precursors.

Said phosphorus can advantageously be introduced alone or as a mixture with the nickel, molybdenum and/or tungsten, and this can be done during any of the stages of impregnation of the precursors of the hydrogenating function if these are introduced a number of times. Said phosphorus can also be introduced, in all or part, during the impregnation of an oxygen- and/or nitrogen- and/or sulfur-containing organic compound, if the latter is introduced separately from the precursors of the hydrogenating function (case of the post- and preimpregnation which are described subsequently). It can also be introduced from the synthesis of the support, at any stage of the synthesis of the latter. It can thus be introduced before, during or after the kneading of the chosen alumina gel matrix, such as, for example and preferably, aluminum oxyhydroxide (boehmite), which is the alumina precursor.

The preferred phosphorus precursor is orthophosphoric acid $H_3PO_4$ but its salts and esters, such as ammonium phosphates, are also suitable. The phosphorus can also be introduced at the same time as the element(s) from group VIb in the form of Keggin, lacunary Keggin, substituted Keggin or Strandberg-type heteropoly anions.

Any impregnation solution described in the present invention may comprise any polar solvent known to a person skilled in the art. Said polar solvent used is advantageously chosen from the group formed by methanol, ethanol, water, phenol and cyclohexanol, taken alone or as a mixture. Preferably, a polar protic solvent is used. A list of the common polar solvents and also their dielectric constant can be found in the book "Solvents and Solvent Effects in Organic Chemistry", C. Reichardt, Wiley-VCH, 3rd edition, 2003, pages 472-474. Very preferably, the solvent used is water or ethanol and particularly preferably the solvent is water.

When the catalyst additionally comprises a dopant chosen from boron, fluorine or a mixture of boron and fluorine, the introduction of this (these) dopant(s) can be carried out in the same way as the introduction of phosphorus described above at various stages of the preparation and in various ways.

The boron precursors can be boric acid, orthoboric acid $H_3BO_3$, ammonium diborate or pentaborate, boron oxide or boric esters. The boron can be introduced, for example, by a solution of boric acid in a water/alcohol mixture or in a water/ethanolamine mixture. Preferably, the boron precursor, if boron is introduced, is orthoboric acid.

The fluorine precursors which can be used are well known to a person skilled in the art. For example, fluoride anions can be introduced in the form of hydrofluoric acid or its salts. These salts are formed with alkali metals, ammonium or an organic compound. In the latter case, the salt is advantageously formed in the reaction mixture by reaction between the organic compound and hydrofluoric acid. The fluorine can be introduced, for example, by impregnation of an aqueous solution of hydrofluoric acid or of ammonium fluoride or of ammonium difluoride.

When the catalyst additionally comprises an oxygen- and/or nitrogen- and/or sulfur-containing organic compound, the latter is introduced before the drying stage b). The organic compound is generally introduced by impregnation, in the presence or absence of the nickel, molybdenum, tungsten and phosphorus and in the presence or absence of a solvent.

The introduction of the organic compound comprises several embodiments which differ in particular in the moment of the introduction of the organic compound with respect to the introduction of the metals. It can be carried out either at the same time as the impregnation of the metals (co-impregnation), or after the impregnation of the metals (post-impregnation), or finally before the impregnation of the metals (pre-impregnation), in particular during the preparation of the support, and preferentially during the shaping or by impregnation on a preformed support. Each embodiment, taken alone or in combination, can proceed in one or more stages.

Furthermore, the contacting stage can combine at least two embodiments, for example the co-impregnation and the post-impregnation. According to an alternative embodiment, the contacting operation according to stage a) combines at least two contacting embodiments, for example the co-impregnation of the nickel, molybdenum, tungsten and phosphorus with an organic compound, followed by drying at a temperature of less than 200° C., then by a post-impregnation of an organic compound which can be identical to or different from that used for the co-impregnation. Each embodiment, taken alone or in combination, can proceed in one or more stages.

The organic compound(s) is (are) advantageously introduced into an impregnation solution which, depending on the preparation embodiment, can be the same solution as or a different solution from that containing the nickel, molybdenum and tungsten precursors and phosphorus, in an amount corresponding:

to a molar ratio of the organic compound to the sum of the elements from group VIb of the catalyst (Mo and W) precursors of between 0.01 and 5 mol/mol, preferably of between 0.05 and 3 mol/mol, preferably of between 0.05 and 1.5 mol/mol and very preferably of between 0.1 and 1.2 mol/mol, calculated on the basis of the components introduced into the impregnation solution(s), and to a molar ratio of the organic compound to element(s) from group VIII of the catalyst (Ni) precursor of between 0.02 and 17 mol/mol, preferably of between 0.1 and 10 mol/mol, preferably of between 0.15 and 8 mol/mol and very preferably of between 0.6 and 5 mol/mol, calculated on the basis of the components introduced into the impregnation solution(s).

When several organic compounds are present, the various molar ratios apply for each of the organic compounds present.

Advantageously, after each impregnation stage, the impregnated support is left to mature. Maturation makes it possible for the impregnation solution to diffuse and for the precursors to disperse homogeneously within the support.

Any maturation stage described in the present invention is advantageously carried out at atmospheric pressure, in a water-saturated atmosphere and at a temperature of between 17° C. and 50° C., and preferably at ambient temperature. Generally, a maturation time of between ten minutes and forty-eight hours and preferably of between thirty minutes and five hours is sufficient. Longer periods of time are not ruled out but do not necessarily contribute an improvement.

In accordance with stage b) of the preparation process according to the invention, the catalyst precursor obtained in stage a), which is optionally matured, is subjected to a drying stage at a temperature of less than 200° C., preferably of between 50° C. and 180° C., in a preferred way between 70° C. and 150° C. and in a very preferred way between 75° C. and 130° C.

The drying stage is advantageously carried out by any technique known to a person skilled in the art. It is advantageously carried out at atmospheric pressure or at reduced pressure, and preferably at atmospheric pressure. It is advantageously carried out in a traversed bed using hot air or any other hot gas. Preferably, when the drying is carried out in a fixed bed, the gas used is either air or an inert gas, such as argon or nitrogen. Very preferably, the drying is carried out in a traversed bed in the presence of nitrogen and/or air.

Preferably, the drying stage has a short duration of between 5 minutes and 4 hours, preferably between 30 minutes and 4 hours and very preferably between 1 hour and 3 hours. When an organic compound is present, the drying is then carried out so as preferentially to retain at least 30% of the organic compound introduced; preferably, this amount is greater than 50% and more preferably still greater than 70%, calculated on the basis of the carbon remaining on the catalyst. On conclusion of the drying stage b), a dried catalyst is obtained.

Optionally, the drying stage b) can be followed by a calcination stage c).

According to an this alternative form, on conclusion of the drying stage b), a calcination stage c) is carried out at a temperature of between 200° C. and 600° C., preferably of between 250° C. and 550° C., under an inert atmosphere (for example nitrogen) or under an atmosphere containing oxygen (for example air). The duration of this heat treatment is generally between 0.5 hour and 16 hours, preferably between 1 hour and 5 hours. After this treatment, the active phase is thus found generally in the oxide form; the heteropoly anions are thus converted into oxides. Likewise, the catalyst no longer contains or contains very little organic compound when it has been introduced. However, the introduction of the organic compound during its preparation has made it possible to increase the dispersion of the active phase, thus leading to a more active catalyst.

When an organic compound is present, the catalyst is preferably not subjected to a calcination. Calcination is understood here to mean a heat treatment under a gas containing air or oxygen at a temperature of greater than or equal to 200° C.

However, the catalyst precursor can undergo a calcination stage before the introduction of the organic compound, in particular after the impregnation of the nickel, molybdenum and tungsten, and phosphorus.

The catalyst according to the invention can be a fresh catalyst, that is to say a catalyst which has not been used as catalyst previously in a catalytic unit and in particular in hydrotreating and/or hydrocracking.

The catalyst according to the invention can also be a regenerated and/or rejuvenated catalyst. A regenerated and/or rejuvenated catalyst is understood to mean a catalyst which has been used as catalyst in a catalytic unit and in particular in hydrotreating and/or hydrocracking and which has been subjected to at least one stage of partial or complete removal of coke, for example by calcination (regeneration). The regeneration can be carried out by any means known to a person skilled in the art. The regeneration is generally carried out by calcination at temperatures of between 350° C. and 550° C., and generally between 400° C. and 520° C., or between 420° C. and 520° C., or between 450° C. and 520° C., temperatures of less than 500° C. often being advantageous.

When the regenerated catalyst no longer comprises enough active phase or phosphorus, or when it exhibits a ratio or ratios outside the ratios described, the regenerated catalyst can be rejuvenated by introducing one or more precursors of the active phase and/or phosphorus into the regenerated catalyst. It is also possible to introduce at least one organic compound simultaneously with the metals and phosphorus or separately. The organic compound introduced may or may not be identical to the organic compound of the fresh catalyst when this catalyst comprised such an organic compound. The operating conditions described above concerning the maturation, the drying and the optional calcination and the optional sulfidation are, of course, applicable in the context of this last embodiment.

Before its use for the hydrotreating and/or hydrocracking reaction, it is advantageous to transform the catalyst obtained according to any one of the modes of introduction described in the present invention into a sulfided catalyst in order to form its active entity. This activation or sulfidation stage is carried out by methods well known to a person skilled in the art, and advantageously under a sulfo-reductive atmosphere in the presence of hydrogen and hydrogen sulfide.

According to an alternative form, the catalyst is advantageously subjected to a sulfidation stage after drying b) or the optional calcination stage c).

Said catalyst is advantageously sulfided ex situ or in situ. The sulfiding agents are $H_2S$ gas, elemental sulfur, $CS_2$, mercaptans, sulfides and/or polysulfides, hydrocarbon cuts having a boiling point of less than 400° C. containing sulfur compounds or any other sulfur-containing compound used for the activation of hydrocarbon feedstocks with a view to sulfiding the catalyst. Said sulfur-containing compounds are advantageously chosen from alkyl disulfides, such as, for example, dimethyl disulfide (DMDS), alkyl sulfides, such as, for example, dimethyl sulfide, thiols, such as, for example, n-butyl mercaptan (or 1-butanethiol), and polysulfide compounds of tert-nonyl polysulfide type. The catalyst can also be sulfided by the sulfur contained in the feedstock to be desulfurized. Preferably, the catalyst is sulfided in situ in the presence of a sulfiding agent and of a hydrocarbon feedstock. Very preferably, the catalyst is sulfided in situ in the presence of a hydrocarbon feedstock additivated with dimethyl disulfide.

Hydrotreating and/or Hydrocracking Process

Finally, another subject matter of the invention is the use of the catalyst according to the invention or prepared according to the preparation process according to the invention in processes for the hydrotreating and/or hydrocracking of hydrocarbon cuts.

The catalyst according to the invention, and which has preferably been subjected beforehand to a sulfidation stage, is advantageously used for hydrotreating and/or hydrocracking reactions of hydrocarbon feedstocks, such as petroleum cuts, cuts resulting from coal, or hydrocarbons produced from natural gas, optionally as mixtures, or also from a hydrocarbon cut resulting from biomass and more particularly for hydrogenation, hydrodenitrogenation, hydrodearomatization, hydrodesulfurization, hydrodeoxygenation, hydrodemetallization or hydroconversion reactions of hydrocarbon feedstocks.

In these uses, the catalyst according to the invention, and which has preferably been subjected beforehand to a sulfidation stage, exhibits an improved activity in comparison with the catalysts of the prior art. This catalyst can also advantageously be used during the pretreatment of catalytic cracking or hydrocracking feedstocks, or the hydrodesulfurization of residues or the forced hydrodesulfurization of gas oils (ULSD: ultra-low-sulfur diesel).

The feedstocks employed in the hydrotreating process are, for example, gasolines, gas oils, vacuum gas oils, atmospheric residues, vacuum residues, atmospheric distillates, vacuum distillates, heavy fuel oils, oils, waxes and paraffins, spent oils, deasphalted residues or crudes, feedstocks originating from thermal or catalytic conversion processes, lignocellulose feedstocks or, more generally, feedstocks resulting from biomass, such as vegetable oils, taken alone or as a mixture. The feedstocks which are treated, and in particular those mentioned above, generally contain heteroatoms, such as sulfur, oxygen and nitrogen, and, for heavy feedstocks, they usually also contain metals.

The operating conditions used in the processes implementing the reactions for the hydrotreating of hydrocarbon feedstocks described above are generally as follows: the temperature is advantageously between 180° C. and 450° C. and preferably between 250° C. and 440° C., the pressure is advantageously between 0.5 and 30 MPa and preferably between 1 and 18 MPa, the hourly space velocity is advantageously between 0.1 and 20 $h^{-1}$ and preferably between 0.2 and 5 $h^{-1}$, and the hydrogen/feedstock ratio, expressed as volume of hydrogen, measured under standard temperature and pressure conditions, per volume of liquid feedstock, is advantageously between 50 l/l and 5000 l/l and preferably 80 l/l and 2000 l/l.

According to a first mode of use, said hydrotreating process according to the invention is a process for the hydrotreating, and in particular for the hydrodesulfurization (HDS), of a gas oil cut carried out in the presence of at least one catalyst according to the invention. Said hydrotreating process according to the invention is targeted at removing the sulfur-based compounds present in said gas oil cut so as to meet the environmental standards in force, namely a permitted sulfur content of up to 10 ppm. It also makes it possible to reduce the contents of aromatics and of nitrogen of the gas oil cut to be hydrotreated.

Said gas oil cut to be hydrotreated according to the process of the invention contains from 0.02% to 5.0% by weight of sulfur. It advantageously results from straight-run distillation (or straight-run gas oil), from a coking unit, from a visbreaking unit, from a steam cracking unit, from a unit for the hydrotreating and/or hydrocracking of heavier feedstocks and/or from a catalytic cracking unit (fluid catalytic cracking). Said gas oil cut preferentially exhibits at least 90% of compounds, the boiling point of which is between 250° C. and 400° C. at atmospheric pressure.

The process for the hydrotreating of said gas oil cut according to the invention is carried out under the following operating conditions: a temperature of between 200° C. and 400° C., preferentially between 300° C. and 380° C., a total pressure of between 2 MPa and 10 MPa and more preferentially between 3 MPa and 8 MPa, with a ratio by volume of hydrogen per volume of hydrocarbon feedstock, expressed as volume of hydrogen, measured under standard temperature and pressure conditions, per volume of liquid feedstock, of between 100 and 600 liters per liter and more preferentially between 200 and 400 liters per liter, and an hourly space velocity (HSV) of between 0.5 and 10 $h^{-1}$, preferentially between 0.7 and 8 $h^{-1}$.

The HSV corresponds to the inverse of the contact time expressed in hours and is defined by the ratio of the flow rate by volume of liquid hydrocarbon feedstock per volume of catalyst charged to the reaction unit implementing the hydrotreating process according to the invention. The reaction unit implementing the process for the hydrotreating of said gas oil cut according to the invention is preferentially operated as a fixed bed, as a moving bed or as an ebullated bed, preferably as a fixed bed.

According to a second mode of use, said hydrotreating and/or hydrocracking process according to the invention is a process for the hydrotreating (in particular hydrodesulfurization, hydrodenitrogenation, hydrogenation of aromatics) and/or hydrocracking of a vacuum distillate cut carried out in the presence of at least one catalyst according to the invention. Said hydrotreating and/or hydrocracking process, otherwise known as hydrocracking or hydrocracking pretreatment process according to the invention, is targeted, as the case may be, at removing the sulfur-based, nitrogen-based or aromatic compounds present in said distillate cut so as to carry out a pretreatment before conversion in catalytic cracking or hydroconversion processes, or at hydrocracking the distillate cut which would optionally have been pretreated beforehand, if necessary.

Highly varied feedstocks can be treated by the processes for the hydrotreating and/or hydrocracking of vacuum distillates described above. Generally, they contain at least 20% by volume and often at least 80% by volume of compounds boiling above 340° C. at atmospheric pressure. The feedstock can, for example, be vacuum distillates and also feedstocks originating from units for the extraction of aromatics from lubricant oil bases or resulting from the solvent dewaxing of lubricant oil bases, and/or from deasphalted oils, or also the feedstock can be a deasphalted oil or paraffins resulting from the Fischer-Tropsch process, or also any mixture of the feedstocks mentioned above. In general, the feedstocks have a T5 boiling point of greater than 340° C. at atmospheric pressure and better still of greater than 370° C. at atmospheric pressure, that is to say that 95% of the compounds present in the feedstock have a boiling point of greater than 340° C. and better still of greater than 370° C. The nitrogen content of the feedstocks treated in the processes according to the invention is usually greater than 200 ppm by weight, preferably between 500 and 10 000 ppm by weight. The sulfur content of the feedstocks treated in the processes according to the invention is usually between 0.01% and 5.0% by weight. The feedstock can optionally contain metals (for example nickel and vanadium). The content of asphaltenes is generally less than 3000 ppm by weight.

The hydrotreating and/or hydrocracking catalyst is generally brought into contact, in the presence of hydrogen, with the feedstocks described above, at a temperature of greater than 200° C., often of between 250° C. and 480° C., advantageously of between 320° C. and 450° C., preferably between 330° C. and 435° C., under a pressure of greater than 1 MPa, often of between 2 and 25 MPa, preferably between 3 and 20 MPa, the space velocity being between 0.1 and 20.0 $h^{-1}$ and preferably 0.1-6.0 $h^{-1}$, preferably 0.2-3.0 $h^{-1}$, and the amount of hydrogen introduced is such that the liter of hydrogen/liter of hydrocarbon ratio by volume, expressed as volume of hydrogen, measured under standard temperature and pressure conditions, per volume of liquid feedstock, is between 80 and 5000 l/l and generally between 100 and 2000 l/l. These operating conditions used in the processes according to the invention generally make it possible to obtain conversions per pass, into products having boiling points of less than 340° C. at atmospheric pressure and better still of less than 370° C. at atmospheric pressure, of greater than 15% and more preferably still of between 20% and 95%.

The processes for the hydrotreating and/or hydrocracking of vacuum distillates employing the catalysts according to the invention cover the pressure and conversion ranges extending from mild hydrocracking to high-pressure hydrocracking. Mild hydrocracking is understood to mean a hydrocracking which results in moderate conversions, generally of less than 40%, and which operates at low pressure, generally between 2 MPa and 6 MPa.

The catalyst according to the invention can be used alone, in a single or several fixed bed catalytic beds, in one or more reactors, in a "one-stage" hydrocracking scheme, with or without liquid recycling of the unconverted fraction, or also in a "two-stage" hydrocracking scheme, optionally in combination with a hydrorefining catalyst located upstream of the catalyst of the present invention.

According to a third mode of use, said hydrotreating and/or hydrocracking process according to the invention is advantageously employed as pretreatment in a fluidized bed catalytic cracking (or FCC: Fluid Catalytic Cracking) process. The operating conditions of the pretreatment in terms of range of temperature, pressure, hydrogen recycling rate and hourly space velocity are generally identical to those described above for the processes for the hydrotreating and/or hydrocracking of vacuum distillates. The FCC process can be carried out in a conventional way known to a person skilled in the art under suitable cracking conditions for the purpose of producing hydrocarbon products of lower molecular weight. A summary description of catalytic cracking will be found, for example, in Ullmann's Encyclopedia of Industrial Chemistry, Volume A18, 1991, pages 61 to 64.

According to a fourth mode of use, said hydrotreating and/or hydrocracking process according to the invention is a process for the hydrotreating (in particular hydrodesulfurization) of a gasoline cut in the presence of at least one catalyst according to the invention.

Unlike other hydrotreating processes, the hydrotreating (in particular the hydrodesulfurization) of gasolines has to make it possible to respond to a twofold conflicting constraint: to provide extreme hydrodesulfurization of gasolines and to limit the hydrogenation of the unsaturated compounds present in order to limit the loss in octane number.

The feedstock is generally a hydrocarbon cut having a distillation range of between 30° C. and 260° C. Preferably, this hydrocarbon cut is a cut of the gasoline type. Very preferably, the gasoline cut is an olefinic gasoline cut resulting, for example, from a catalytic cracking (Fluid Catalytic Cracking) unit.

The hydrotreating process consists in bringing the hydrocarbon cut into contact with the catalyst according to the invention and hydrogen under the following conditions: at a temperature of between 20° and 400° C., preferably of between 23° and 330° C., at a total pressure of between 1 and 3 MPa, preferably of between 1.5 and 2.5 MPa, at an hourly space velocity (HSV), defined as being the flow rate by volume of feedstock with respect to the volume of catalyst, of between 1 and 10 $h^{-1}$, preferably of between 2 and 6 $h^{-1}$, and at a hydrogen/gasoline feedstock ratio by volume of between 100 and 600 Sl/l, preferably of between 200 and 400 Sl/l.

The process for the hydrotreating of the gasolines can be carried out in one or more reactors in series of the fixed bed type or of the ebullated bed type. If the process is carried out by means of at least two reactors in series, it is possible to provide a device for the removal of the $H_2S$ from the effluent resulting from the first hydrodesulfurization reactor before treating said effluent in the second hydrodesulfurization reactor.

EXAMPLES

The examples which follow demonstrate the significant gain in activity on the catalysts according to the invention in comparison with the catalysts of the prior art.

Examples 1 to 10 describe the preparation of catalysts C1 to C10. The final composition of each catalyst in metals and in phosphorus, expressed in the form of oxides and with respect to the weight of the catalyst, and also the $WO_3/MoO_3$, $NiO/(WO_3+MoO_3)$ and $P_2O_5/(WO_3+MoO_3)$ ratios, appear in table 1 below.

Examples 1 to 6 describe the preparation of catalysts C1 to C6 not in accordance with the invention having a $WO_3/MoO_3$, $NiO/(WO_3+MoO_3)$ or $P_2O_5/(WO_3+MoO_3)$ ratio respectively below and above the claimed range.

Examples 7 to 10 describe the preparation of catalysts C7 to C10 in accordance with the invention having a $WO_3/MoO_3$, $NiO/(WO_3+MoO_3)$ or $P_2O_5/(WO_3+MoO_3)$ ratio respectively in the claimed range.

Example 1: Preparation of the Catalyst NiMoWP on Alumina C1 (not in Accordance with the Invention)

Nickel, molybdenum, tungsten and phosphorus are added to 100 g of an alumina support A1 exhibiting a loss on ignition of 4.9% by weight, a BET specific surface of 230 $m^2/g$, a pore volume, measured by mercury porosimetry, of 0.78 ml/g and a mean pore diameter of 11.5 nm, defined as the median diameter by volume by mercury porosimetry, and which is provided in the "extrudate" form. The impregnation solution is prepared by dissolution at 90° C. of molybdenum oxide (16.5 g), ammonium metatungstate (55.9 g), nickel nitrate (25.8 g) and 10.2 grams of an 85% by weight solution of orthophosphoric acid in 78 ml of distilled water. After dry impregnation, the extrudates are left to mature in a water-saturated atmosphere at ambient temperature for 24 h and then they are dried at 90° C. for 16 h. The dried catalyst thus obtained is denoted C1.

Example 2: Preparation of the Catalyst NiMoWP on Alumina C2 (not in Accordance with the Invention)

Nickel, molybdenum, tungsten and phosphorus are added to the same support A1 as presented in example 1. The impregnation solution is prepared by dissolution at 90° C. of molybdenum oxide (1.9 g), ammonium metatungstate (82.5 g), nickel nitrate (25.8 g) and 10.2 grams of an 85% by weight solution of orthophosphoric acid in 78 ml of distilled water. After dry impregnation, the extrudates are left to mature in a water-saturated atmosphere at ambient temperature for 24 h and then they are dried at 90° C. for 16 h. The dried catalyst thus obtained is denoted C2.

Example 3: Preparation of the Catalyst NiMoWP on Alumina C3 (not in Accordance with the Invention)

Nickel, molybdenum, tungsten and phosphorus are added to the same support A1 as presented in example 1. The impregnation solution is prepared by dissolution at 90° C. of molybdenum oxide (6.1 g), ammonium metatungstate (74.8 g), nickel nitrate (18.2 g) and 10.2 grams of an 85% by weight solution of orthophosphoric acid in 78 ml of distilled water. After dry impregnation, the extrudates are left to mature in a water-saturated atmosphere at ambient temperature for 24 h and then they are dried at 90° C. for 16 h. The dried catalyst thus obtained is denoted C3.

Example 4: Preparation of the Catalyst NiMoWP on Alumina C4 (not in Accordance with the Invention)

Nickel, molybdenum, tungsten and phosphorus are added to the same support A1 as presented in example 1. The impregnation solution is prepared by dissolution at 90° C. of molybdenum oxide (6.1 g), ammonium metatungstate (74.8 g), nickel nitrate (35.4 g) and 10.2 grams of an 85% by weight solution of orthophosphoric acid in 78 ml of distilled water. After dry impregnation, the extrudates are left to mature in a water-saturated atmosphere at ambient temperature for 24 h and then they are dried at 90° C. for 16 h. The dried catalyst thus obtained is denoted C4.

Example 5: Preparation of the Catalyst NiMoWP on Alumina C5 (not in Accordance with the Invention)

Nickel, molybdenum, tungsten and phosphorus are added to the same support A1 as presented in example 1. The impregnation solution is prepared by dissolution at 90° C. of molybdenum oxide (6.1 g), ammonium metatungstate (74.8 g), nickel nitrate (25.8 g) and 7.2 grams of an 85% by weight solution of orthophosphoric acid in 78 ml of distilled water. After dry impregnation, the extrudates are left to mature in a water-saturated atmosphere at ambient temperature for 24 h and then they are dried at 90° C. for 16 h. The dried catalyst thus obtained is denoted C5.

Example 6: Preparation of the Catalyst NiMoWP on Alumina C6 (not in Accordance with the Invention)

Nickel, molybdenum, tungsten and phosphorus are added to the same support A1 as presented in example 1. The impregnation solution is prepared by dissolution at 90° C. of molybdenum oxide (6.1 g), ammonium metatungstate (74.8 g), nickel nitrate (25.8 g) and 14.0 grams of an 85% by weight solution of orthophosphoric acid in 78 ml of distilled water. After dry impregnation, the extrudates are left to mature in a water-saturated atmosphere at ambient temperature for 24 h and then they are dried at 90° C. for 16 h. The dried catalyst thus obtained is denoted C6.

Example 7: Preparation of the Catalyst NiMoWP on Alumina C7 (in Accordance with the Invention)

Nickel, molybdenum, tungsten and phosphorus are added to the same support A1 as presented in example 1. The impregnation solution is prepared by dissolution at 90° C. of molybdenum oxide (6.1 g), ammonium metatungstate (74.8 g), nickel nitrate (25.8 g) and 10.2 grams of an 85% by weight solution of orthophosphoric acid in 78 ml of distilled water. After dry impregnation, the extrudates are left to mature in a water-saturated atmosphere at ambient temperature for 24 h and then they are dried at 90° C. for 16 hours. The dried catalyst thus obtained is denoted C7.

Example 8: Preparation of the Catalyst NiMoWP on Alumina C8 (in Accordance with the Invention) by Co-Impregnation of an Organic Compound (Oxalic Acid)

Nickel, molybdenum, tungsten and phosphorus are added to the alumina support described above in example 1 and which is provided in the "extrudate" form. The impregnation solution is prepared by dissolution at 90° C. of molybdenum oxide (4.3 g), ammonium metatungstate (70.5 g), nickel nitrate (21.8 g) and 9.3 grams of an 85% by weight solution of orthophosphoric acid in 78 ml of distilled water. After homogenization of the preceding mixture, 6.7 g of oxalic acid were added before adjustment of the volume of solution to the pore volume of the support by addition of water. The (oxalic acid)/(Mo+W) molar ratio is equal to 0.25 mol/mol and the (oxalic acid)/Ni molar ratio is equal to 1 mol/mol. After dry impregnation, the extrudates are left to mature in a water-saturated atmosphere at ambient temperature for 24 h and then they are dried at 120° C. for 16 h. The catalyst, dried and additivated with oxalic acid, thus obtained is denoted C8.

Example 9: Preparation of the Catalyst NiMoWP on Alumina C9 (in Accordance with the Invention) by Post-Additivation of an Organic Compound (Ascorbic Acid)

100 g of catalyst C7 precursor described above in example 3 and which is provided in the "extrudate" form are impregnated with an aqueous solution containing 28.8 g of ascorbic acid and the volume of which is equal to the pore volume of the catalyst C7 precursor. The amounts involved are such that the amount of ascorbic acid is 0.5 mol per mole of molybdenum and mole of tungsten (corresponding to 1.9 mol per mole of nickel). The extrudates are left to mature in a water-saturated atmosphere at ambient temperature for 16 h. The catalyst C9 precursor is then dried at 120° C. for 2 hours to give the catalyst C9.

Example 10: Preparation of the Catalyst NiMoWP on Silica-Alumina C10 (in Accordance with the Invention) by Post-Additivation of an Organic Compound (1-Methyl-2-Pyrrolidinone)

Nickel, molybdenum, tungsten and phosphorus are added to a silica-alumina support containing 10% by weight of silicon and exhibiting a loss on ignition of 0.7% by weight, a BET specific surface of 249 $m^2/g$, a pore volume, measured by mercury porosimetry, of 0.45 ml/g and a mean pore diameter of 7.3 nm, defined as the median diameter by volume by mercury porosimetry, and which is provided in the "extrudate" form. The impregnation solution is prepared by dissolution at 90° C. of molybdenum oxide (4.6 g), ammonium metatungstate (75.8 g), nickel nitrate (25.3 g) and 11.1 grams of an 85% by weight solution of orthophosphoric acid in 55.7 ml of distilled water. After dry impregnation, the extrudates are left to mature in a water-saturated atmosphere at ambient temperature for 24 h and then they are dried at 90° C. for 16 h. The catalyst precursor is then impregnated with an aqueous solution containing 25.9 g of 1-methyl-2-pyrrolidinone and the volume of which is equal to the pore volume of the catalyst C7 precursor. The amounts involved are such that the amount of 1-methyl-2-pyrrolidinone is 0.8 mol per mole of molybdenum and mole of tungsten (corresponding to 3.0 mol per mole of nickel). The extrudates are left to mature in a water-saturated atmosphere at ambient temperature for 16 h. The catalyst C10 precursor is then dried at 120° C. for 2 hours to give the catalyst C10.

Example 11: Preparation of the Catalyst NiMoWP on Alumina C11 (Comparative)

Nickel, molybdenum, tungsten and phosphorus are added to the same support A1 as presented in example 1. The impregnation solution is prepared by dissolution at 90° C. of molybdenum oxide (7.7 g), ammonium metatungstate (85.3 g), nickel nitrate (37.6 g) and 7.5 grams of an 85% by weight solution of orthophosphoric acid in 78 ml of distilled water. After dry impregnation, the extrudates are left to mature in a water-saturated atmosphere at ambient temperature for 24 h and then they are dried at 90° C. for 16 hours. The dried catalyst thus obtained is denoted C11.

Example 12: Preparation of the Catalyst NiMoWP on Alumina C12 (Comparative) by Post-Additivation of an Organic Compound (Citric Acid)

100 g of catalyst C11 precursor which is provided in the "extrudate" form are impregnated with an aqueous solution containing 7.8 g of citric acid and the volume of which is equal to the pore volume of the catalyst C11 precursor. The amounts involved are such that the (citric acid)/(NiO+MoO$_3$+WO$_3$) molar ratio is 0.08. The extrudates are left to mature in a water-saturated atmosphere at ambient temperature for 16 h. The catalyst C12 precursor is then dried at 120° C. for 2 hours to give the catalyst C12.

Example 13: Preparation of the Catalyst NiMoWP on Alumina C13 (in Accordance with the Invention) by Post-Additivation of an Organic Compound (Citric Acid)

100 g of catalyst C7 precursor of the patent application and which is provided in the "extrudate" form are impregnated with an aqueous solution containing 6.4 g of citric acid and the volume of which is equal to the pore volume of the catalyst C7 precursor. The amounts involved are such that the (citric acid)/(NiO+MoO$_3$+WO$_3$) molar ratio is 0.08. The extrudates are left to mature in a water-saturated atmosphere at ambient temperature for 16 h. The catalyst C13 precursor is then dried at 120° C. for 2 hours to give the catalyst C13.

Example 14: Evaluation in Hydrogenation of the Aromatics (HDA) of Gas Oil of the Catalysts C1, C2, C3, C4, C5, C6, C11 and C12 (not in Accordance with the Invention) and C7, C8, C9, C10 and C13 (in Accordance with the Invention)

The catalysts C1, C2, C3, C4, C5, C6, C11 and C12 (not in accordance with the invention) and C7, C8, C9, C10 and C13 (in accordance with the invention) were tested in hydrogenation of the aromatics (HDA) of gas oil. The feedstock is a mixture of 30% by volume of gas oil resulting from atmospheric distillation (also referred to as straight-run distillation) and 70% by volume of light gas oil resulting from a catalytic cracking unit (also known as LCO for Light Cycle Oil). The characteristics of the test feedstock used are as follows: density at 15° C.=0.8994 g/cm$^3$ (NF EN ISO 12185), refractive index at 20° C.=1.5143 (ASTM D1218-12), sulfur content=0.38% by weight, nitrogen content=0.05% by weight.

Simulated Distillation (ASTM D2887):

IP: 133° C.

10%: 223° C.

50%: 285° C.

90%: 357° C.

FP: 419° C.

The test is carried out in an isothermal pilot reactor having a traversed fixed bed, the fluids circulating from the bottom upward.

The catalysts are sulfided beforehand in situ at 350° C. in the reactor under pressure by means of an atmospheric (straight-run) distillation gas oil feedstock (density at 15° C.=0.8491 g/cm$^3$ (NF EN ISO 12185) and initial sulfur content=0.42% by weight), to which 2% by weight of dimethyl disulfide are added.

The tests of hydrogenation of the aromatics were carried out under the following operating conditions: a total pressure of 8 MPa, a catalyst volume of 4 cm$^3$, a temperature of 330° C., with a hydrogen flow rate of 3.0 l/h and with a feedstock flow rate of 4.5 cm$^3$/h.

The characteristics of the effluents are analyzed: density at 15° C. (NF EN ISO 12185), refractive index at 20° C. (ASTM D1218-12), simulated distillation (ASTM D2887), sulfur content and nitrogen content. The residual contents of aromatic carbon are calculated by the n-d-M method (ASTM D3238). The degree of hydrogenation of the aromatics is calculated as the ratio of the content of aromatic carbon of the effluents to that of the test feedstock. The catalytic performance qualities of the catalysts tested are given in table 1. They are expressed as relative volume activity (RVA) with respect to the catalyst C7 chosen as reference, assuming an order of 1.7 for the reaction concerned.

Table 1 clearly shows the gain with regard to the catalytic effect contributed by the specific formulations according to the invention. This is because the catalysts C1, C2, C3, C4, C5, C6, C11 and C12 (not in accordance) exhibit a lower activity than that obtained for the catalyst C7 (according to the invention). The catalysts C8, C9, C10 and C13 (according to the invention) also exhibit higher activities than the catalyst C7.

Table 1 clearly shows the gain with regard to the catalytic effect contributed by the specific formulations according to the invention. This is because the non-additivated catalyst C11 (comparative) exhibits a lower activity than that obtained for the non-additivated catalyst C7 (according to the invention). Likewise, the additivated catalyst C12 (comparative) exhibits a lower activity than that obtained for the additivated catalyst C13 (according to the invention).

For the two comparisons, only the contents of metals and phosphorus and the ratios were modified.

The advantage of the catalysts according to the invention is therefore significant, whatever their mode of preparation, thus with a greater effectiveness than that of the other compounds of the existing prior art.

TABLE 1

Relative isovolume activities in hydrogenation of the aromatics of gas oil of the catalysts C1, C2, C3, C4, C5 and C6, and also C11 and C12 (not in accordance with the invention), and C8, C9, C10 and C13 (in accordance with the invention), compared with the catalyst C7 (in accordance).

| Catalyst | % by weight NiO | % by weight MoO$_3$ | % by weight WO$_3$ | % by weight P$_2$O$_5$ | WO$_3$/MoO$_3$ (mol/mol) | NiO/(WO$_3$+MoO$_3$) (mol/mol) | P$_2$O$_5$/(WO$_3$+MoO$_3$) (mol/mol) | RVA |
|---|---|---|---|---|---|---|---|---|
| C1 (comp.) | 3.8 | 9.5 | 28.4 | 3.6 | 1.9 | 0.27 | 0.135 | 66 |
| C2 (comp.) | 3.6 | 1.0 | 39.9 | 3.4 | 24 | 0.27 | 0.134 | 87 |
| C3 (comp.) | 2.6 | 3.4 | 37.0 | 3.5 | 6.7 | 0.19 | 0.135 | 80 |
| C4 (comp.) | 5.0 | 3.4 | 36.1 | 3.4 | 6.7 | 0.37 | 0.134 | 90 |
| C5 (comp.) | 3.7 | 3.4 | 37.0 | 2.5 | 6.7 | 0.27 | 0.096 | 85 |
| C6 (comp.) | 3.6 | 3.4 | 36.2 | 4.7 | 6.7 | 0.27 | 0.184 | 91 |
| C7 (inv.) | 3.7 | 3.4 | 36.6 | 3.5 | 6.7 | 0.27 | 0.136 | 100 |
| C8 (inv.) | 3.4 | 2.5 | 38.4 | 3.5 | 9.5 | 0.25 | 0.135 | 110 |
| C9 (inv.) | 3.7 | 3.4 | 36.6 | 3.5 | 6.7 | 0.27 | 0.136 | 108 |
| C10 (inv.) | 3.5 | 2.5 | 36.3 | 3.7 | 9 | 0.27 | 0.150 | 112 |
| C11 (comp.) | 5.0 | 4.0 | 39.1 | 2.4 | 6.1 | 0.34 | 0.086 | 72 |
| C12 (comp.) | 5.0 | 4.0 | 39.1 | 2.4 | 6.1 | 0.34 | 0.086 | 80 |
| C13 (inv.) | 3.7 | 3.4 | 36.6 | 3.5 | 6.7 | 0.27 | 0.136 | 106 |

The invention claimed is:

1. A catalyst comprising:
a support based on alumina or silica or silica-alumina, and an active phase consisting of nickel, molybdenum and tungsten, and phosphorus, wherein:
the content of nickel, measured in the NiO form, is between 3% and 4% by weight, with respect to the total weight of the catalyst,
the content of molybdenum, measured in the MoO$_3$ form, is between 2% and 4% by weight, with respect to the total weight of the catalyst,
the content of tungsten, measured in the WO$_3$ form, is between 34% and 40% by weight, with respect to the total weight of the catalyst,
the content of phosphorus, measured in the P$_2$O$_5$ form, is between 3% and 4% by weight, with respect to the total weight of the catalyst,
the WO$_3$/MoO$_3$ molar ratio is between 5.3 and 12.4 mol/mol,
the NiO/(WO$_3$+MoO$_3$) molar ratio is between 0.20 and 0.33 mol/mol, and
the P$_2$O$_5$/(WO$_3$+MoO$_3$) molar ratio is between 0.105 and 0.170 mol/mol.

2. The catalyst as claimed in claim 1, wherein
the content of nickel, measured in the NiO form, is between 3.1% and 3.9% by weight, with respect to the total weight of the catalyst,
the content of molybdenum, measured in the MoO$_3$ form, is between 2.2% and 3.8% by weight, with respect to the total weight of the catalyst,
the content of tungsten, measured in the WO$_3$ form, is between 35% and 39.9% by weight, with respect to the total weight of the catalyst,
the content of phosphorus, measured in the P$_2$O$_5$ form, is between 3.1% and 3.9% by weight, with respect to the total weight of the catalyst,
the WO$_3$/MoO$_3$ molar ratio is between 5.7 and 11.1 mol/mol,
the NiO/(WO$_3$+MoO$_3$) molar ratio is between 0.21 and 0.31 mol/mol, and
the P$_2$O$_5$/(WO$_3$+MoO$_3$) molar ratio is between 0.110 and 0.165 mol/mol.

3. The catalyst as claimed in claim 2, wherein
the content of nickel, measured in the NiO form, is between 3.2% and 3.8% by weight, with respect to the total weight of the catalyst,
the content of molybdenum, measured in the MoO$_3$ form, is between 2.5% and 3.5% by weight, with respect to the total weight of the catalyst,
the content of tungsten, measured in the WO$_3$ form, is between 36% and 39% by weight, with respect to the total weight of the catalyst,
the content of phosphorus, measured in the P$_2$O$_5$ form, is between 3.2% and 3.8% by weight, with respect to the total weight of the catalyst,
the WO$_3$/MoO$_3$ molar ratio is between 6.4 and 9.7 mol/mol,
the NiO/(WO$_3$+MoO$_3$) molar ratio is between 0.22 and 0.30 mol/mol, and
the P$_2$O$_5$/(WO$_3$+MoO$_3$) molar ratio is between 0.115 and 0.160 mol/mol.

4. The catalyst as claimed in claim 1, wherein the density of metals from group VIb, expressed as number of atoms of said metals per unit area of the catalyst, is between 5 and 12 atoms of the metals from group VIb per nm$^2$ of catalyst.

5. The catalyst as claimed claim 1, further comprising an organic compound containing oxygen and/or nitrogen and/or sulfur.

6. The catalyst as claimed in claim 5, wherein the organic compound is: a compound comprising one or more chemical functional groups chosen from a carboxyl, alcohol, thiol, thioether, sulfone, sulfoxide, ether, aldehyde, ketone, ester, carbonate, amine, nitrile, imide, oxime, urea or amide functional group; a compound including a furan ring; or a sugar.

7. The catalyst as claimed in claim 6, in which the organic compound is γ-valerolactone, 2-acetylbutyrolactone, triethylene glycol, diethylene glycol, ethylene glycol, ethylenediaminetetraacetic acid (EDTA), maleic acid, malonic acid, citric acid, acetic acid, oxalic acid, gluconic acid, glucose, fructose, sucrose, sorbitol, xylitol, γ-ketovaleric acid, a di(C$_1$-C$_4$ alkyl) succinate, dimethyl succinate, dimethylformamide, 1-methyl-2-pyrrolidinone, propylene carbonate, 2-methoxyethyl 3-oxobutanoate, bicine, tricine, 2-furaldehyde, 5-hydroxymethylfurfural, 2-acetylfuran, 5-methyl-2- furaldehyde, ascorbic acid, butyl lactate, ethyl lactate, butyl butyryllactate, ethyl 3-hydroxybutanoate, ethyl 3-ethoxypropanoate, 2-ethoxyethyl acetate, 2-butoxyethyl acetate, 2-hydroxyethyl acrylate, 1-vinyl-2-pyrrolidinone, 1,3-dimethyl-2-imidazolidinone, 1,5-pentanediol, 1-(2-hydroxyethyl)-2-pyrrolidinone, 1-(2-hydroxyethyl)-2,5-pyrrolidinedione, 5-methyl-2(3H)-furanone, 1-methyl-2-piperidinone, 4-aminobutanoic acid, butyl glycolate, ethyl 2-mercaptopropanoate, ethyl 4-oxopentanoate, diethyl maleate, dimethyl maleate, dimethyl fumarate, diethyl fumarate, dimethyl adipate, or dimethyl 3-oxoglutarate.

8. The catalyst as claimed in claim 5, wherein the content of organic compound is between 1% and 30% by weight, with respect to the total weight of the catalyst.

9. The catalyst as claimed in claim 1, wherein the catalyst is at least partially sulfided.

10. A process for the preparation of a catalyst as claimed in claim 1, comprising:
   a) bringing at least one nickel precursor, one molybdenum precursor, one tungsten precursor, and phosphorus into contact with a support based on alumina, silica, or silica-alumina, to obtain a catalyst precursor, and
   b) drying said catalyst precursor at a temperature of less than 200° C.

11. The process as claimed in claim 10, further comprising c) calcining the catalyst obtained in b) at a temperature of between 200° C. and 550° C.

12. The process as claimed claim 11, further comprising d) sulfiding the catalyst obtained in b) or c).

13. A process comprising hydrotreating and/or hydrocracking of hydrocarbon cuts by subjecting said cuts to hyrotreating and/or hydrocracking conditions in the presence of a catalyst according to claim 1.

14. The catalyst as claimed in claim 1, wherein the content of nickel, measured in the NiO form, is between 3.1% and 3.9% by weight, with respect to the total weight of the catalyst.

15. The catalyst as claimed in claim 1, wherein the content of molybdenum, measured in the $MoO_3$ form, is between 2.2% and 3.8% by weight, with respect to the total weight of the catalyst.

16. The catalyst as claimed in claim 1, wherein the content of tungsten, measured in the $WO_3$ form, is between 35% and 39.9% by weight, with respect to the total weight of the catalyst.

17. The catalyst as claimed in claim 1, wherein the content of phosphorus, measured in the $P_2O_5$ form, is preferably between 3.1% and 3.9% by weight, with respect to the total weight of the catalyst.

18. The catalyst as claimed in claim 1, wherein the pore volume of the catalyst is between 0.1 $cm^3/g$ and 1.5 $cm^3/g$.

19. The catalyst as claimed in claim 1, wherein the specific surface of the catalyst is between 5 and 350 $m^2/g$.

20. The catalyst as claimed in claim 1, wherein the support further comprises a zeolite, wherein the content of the zeolite is from 0.1% to 50% by weight, with respect to the total weight of the support.

\* \* \* \* \*